(12) United States Patent
Balasubramanian

(10) Patent No.: US 12,273,959 B2
(45) Date of Patent: Apr. 8, 2025

(54) OUTBOUND ROAMING INTO MNO AND ENTERPRISE NETWORKS WITH SHNI BASED SUBSCRIPTION

(71) Applicant: Celona, Inc., Cupertino, CA (US)

(72) Inventor: Srinivasan Balasubramanian, San Diego, CA (US)

(73) Assignee: CELONA, INC., Campbell, CA (US)

( * ) Notice: Subject to any disclaimer, the term of this patent is extended or adjusted under 35 U.S.C. 154(b) by 313 days.

(21) Appl. No.: 17/716,473

(22) Filed: Apr. 8, 2022

(65) Prior Publication Data

US 2022/0330008 A1     Oct. 13, 2022

Related U.S. Application Data

(60) Provisional application No. 63/173,259, filed on Apr. 9, 2021.

(51) Int. Cl.
| | |
|---|---|
| H04W 8/18 | (2009.01) |
| H04W 8/12 | (2009.01) |
| H04W 12/06 | (2021.01) |
| H04W 12/72 | (2021.01) |
| H04W 40/02 | (2009.01) |

(52) U.S. Cl.
CPC ............ *H04W 8/183* (2013.01); *H04W 8/12* (2013.01); *H04W 12/06* (2013.01); *H04W 12/72* (2021.01); *H04W 40/02* (2013.01)

(58) Field of Classification Search
None
See application file for complete search history.

(56) References Cited

U.S. PATENT DOCUMENTS

| | | | |
|---|---|---|---|
| 7,154,901 B2 | 12/2006 | Chava et al. | |
| 11,910,307 B2* | 2/2024 | Brown | H04W 48/18 |
| 2015/0327065 A1* | 11/2015 | Mildh | H04W 48/02 |
| | | | 455/411 |
| 2016/0337310 A1* | 11/2016 | Faccin | H04W 4/90 |
| 2018/0184297 A1 | 6/2018 | Mohamed et al. | |
| 2020/0015137 A1 | 1/2020 | Stojanovski et al. | |
| 2020/0260525 A1* | 8/2020 | Gan | H04W 80/10 |
| 2021/0409335 A1* | 12/2021 | Zhu | H04L 47/24 |
| 2022/0060893 A1* | 2/2022 | Gundavelli | H04L 63/08 |
| 2022/0086641 A1* | 3/2022 | Balasubramanian | |
| | | | H04W 12/64 |

OTHER PUBLICATIONS

Rodriguez, Kari, International Search Report and Written Opinion received from the USRO dated Aug. 11, 2022 for appln. No. PCT/US2022/024016, 21 pgs.
Sanyal, Rajarshi, "Challenges in Interoperability and Roaming Between LTE-Legacy Core for Mobility Management, Routing, Real Time Charging", Jan. 2011, Aalborg University.
Lee, Sun Hwa, International Preliminary Report on Patentability received WIPO dated Oct. 19, 2023 for appln. No. PCT/US2022/024016, 21 pgs.

\* cited by examiner

*Primary Examiner* — Hassan A Phillips
*Assistant Examiner* — Gautam Sharma
(74) *Attorney, Agent, or Firm* — Jaquez Land Greenhaus & McFarland, LLP; Bruce W. Greenhaus

(57) ABSTRACT

A method and apparatus is disclosed that provides a means by which user equipment (UE) having an International Mobile Subscriber Identity (IMSI) that has a Shared Home Network Identity (SHNI) can gain access to a Home Subscriber Server (HSS) to access authentication information when the UE is not currently within its home network.

6 Claims, 9 Drawing Sheets

OUTBOUND ROAMING INTO MNO AND ENTERPRISE NETWORKS WITH SHNI BASED SUBSCRIPTION

CROSS-REFERENCE TO RELATED APPLICATIONS—CLAIMS OF PRIORITY

This utility application (Ser. No. 17/716,473) claims priority under 35 USC section 111 (b) and under 35 USC section 119 (e), to earlier-filed provisional application No. 63/173,259 filed Apr. 9, 2021, entitled "Outbound Roaming Into MNO and Enterprise Networks with SHNI Based Subscription"; and the contents of the above-cited earlier-filed provisional application (App. No.: 63/173,259) are hereby incorporated by reference herein as if set forth in full.

BACKGROUND

(1) Technical Field

The disclosed method and apparatus relate generally to wireless communication systems. In particular, the disclosed method and apparatus relates to wireless communications systems in which user equipment communicates with both a Macro Network Operator (MNO) network and private enterprise network.

(2) Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their enterprise location, and digital solutions more generally, to improve efficiency and reduce costs. Enterprises benefit from optimizing their computing, storage and networking infrastructure, and improving performance of the business applications within their business location. For this purpose, wireless network systems that make effective use of the spectrum within a business enterprise for wireless communication, improve the efficiency of communication within the organization and between the organization and the external entities. This improved communication capability at the enterprise location increases business efficiency and reduces cost.

FIG. 1 is an illustration of a basic configuration for a communication network 100, such as a "4G LTE" (fourth generation Long-Term Evolution) or "5G NW" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs

As used herein, the term "UE", or "devices", or "UE devices" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement. In the illustration of FIG. 1, the UEs 101 include a first mobile phone 101*a*, a second mobile phone 101*b*, a laptop computer 101*c*, and a printer 101*d*.

The UEs 101 connect wirelessly over communication links 105 to a Radio Access Network (RAN) 107 (such as an Evolved Universal Terrestrial Radio Access (E-UTRA) or a 5G RAN) that includes a base station/access point (BS/AP) 109. One of the advantages of such networks is their ability to provide communications to and from multiple wireless devices and provide these wireless devices with access to a large number of other devices and services, even though the devices may be moving.

BS/APs

The term "BS/AP" is used broadly herein to include base stations and access points, such as a cellular base station (BS), including at least an evolved NodeB (eNB) of an LTE network or gNodeB of a 5G network, a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network for a plurality of wireless transceivers (UEs) within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks (such as private enterprise networks), the BS/AP 109 can receive wireless signals from, and send wireless signals to, the UEs 101. The RAN 107 is coupled to the core network 111. Therefore, the RAN 107 and the Core Network 111 provide a system that allows information to flow between a UE in the cellular or private network and other networks (such as the external PDNs 103, a Public Switched Telephone Network (PSTN) or the Internet). Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the resources, such as external PDNs 103, the Core Network 111 provides control of the air interface between the BS/AP 119 and the UEs 101. The Core Network 111 may also coordinate the BS/APs 109 to minimize interference within the network.

The Core Network 111 is also responsible for routing control traffic that is required to authenticate a UE 101. Together with information necessary for authentication, information regarding various characteristics and permissions of the communication to be provided for a particular UE is stored in a Home Subscriber Server (HSS). The HSS is located in the home network (i.e., the network with which the UE contracted for service/access).

CBRS Networks

Recently, additional spectrum has become available for general use by enterprise locations in communicating over a private enterprise network. This spectrum can be used to form a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices.

FIG. 2 is a simplified illustration of a private enterprise network (PEN) 200. A plurality of BS/AP 202 provide wireless access for subscribing UEs 204 to gain access to the PEN 200. The PEN includes a PEN Core Network 222. The PEN Core Network 222 has several functional components, only some of which are relevant to the present disclosure. Note that only those relevant functional components are shown. It should further be noted that not all of the functional components are present in every instance of a PEN. The relevant functional components that are shown include an HSS 201 and a database 212. In some cases, the PEN 200 may also have a Policy and Charging Rules Function (PCRF) 210. The HSS 201 stores information used for authentication of a UE 204 and for setting parameters that determine the manner in which the PEN and other networks will operate when providing services to the UE 204. The information may be stored in a manner that associates the information with a particular UE 204a that is a member of the PEN 200. In addition, one or more other databases 212 (only one shown) may be present in the PEN 200 to provide information to the UE 204 or to other components of the PEN 200. Still further, a PCRF is present in the PEN 200 to provide service control, such as controlling, measuring and monitoring access and access and billing related information, as well as other member access related functions.

FIG. 3 illustrates the roaming architecture for home routed traffic based on 3GPP (Third Generation Partnership Project) specifications. Home routed traffic operates as follows. When a UE 302 enters a Visiting Public Land Mobile Network (VPLMN) 304 as a visitor to the VPLMN 304, the UE 302 must first be authenticated before gaining connectivity through the VPLMN 304. A VPLMN is a network with which a UE is not directly contracting for service, but through which the UE is authorized to gain service based on the contract that the user has with his Home Public Land Mobile Network (HPLMN). Accordingly, to authenticate the UE 302, the VPLMN 304 needs to communicate with the HPLMN's HSS 308 to attain the information required to authenticate the UE 302. In addition, other information about the manner in which the UE 302 can operate is stored in, and recovered from, the HSS 308. This is done by the VPLMN 304 accessing the HPLMN 306 over an S6a interface 307 in a 4G LTE network architecture as shown in FIG. 3. The UE 302 communicates with an MME 303 through the E-UTRAN (i.e., the 4G RAN) 301. The E-UTRAN 301 communicates with the MME 303 over an S1 interface 305. The MME determines that the UE 302 subscribes to the HPLMN 306 and routes authentication control traffic with the HSS 308 in the HPLMN 306 over the S6a interface 307. In this way, information stored in the HSS 308 that is required for authentication of the UE 302 can be retrieved and provided to the MME 303 within the VPLMN 304.

Additionally, in 4G LTE networks, billing information (e.g., the number of blocks of data that were communicated for the purpose of charging for access to the network on a cost per block basis) is communicated from a serving gateway (SGW) 309 in the VPLMN 304 over an S8 interface 312 to a Packet Data Network Gateway (PDN Gateway) 311 in the HPLMN 306. The PDN Gateway 311 communicates with the HPCRF (Home PCRF) 310 over a Gx interface 313. These interfaces and the protocols used to communicate over them are all defined by 3GPP specifications.

Once authenticated, user plane traffic flows through the SGW 309 in the VPLMN 306 to the PDN Gateway 311 in the HPLMN 306. The PDN Gateway 311 provides a gateway to PDNs and other services 315.

FIG. 4 shows a 4G LTE architecture for a VPLMN 404 connecting to the HPLMN 406 using what is referred to as a "local breakout" (LBO). In an LBO, billing information is communicated from a Serving Gateway (SGW) 409 in the VPLMN 404 to a HPCRF (Home PCRF) 408 through a PDN Gateway 412 in the HVPLN 404 and through a VPCRF 414 in the VPLMN 404. The VPCRF 414 communicates with the HPCRF 416 in the HPLMN 406 over an S9 interface 418.

User plane traffic flows directly between the PDN Gateway 412 in the VPLMN 404 and a visitor operated PDN 420. That is, services provided to the UE 302 by the PDN 420 are directly through the VPLMN, rather than having to be routed through the HPLMN 406.

FIG. 5 shows a 5G NR roaming architecture in which traffic is routed through the HPLMN 506 to the UE 302 being serviced through the VPLMN RAN 501. In order to authenticate the UE 302, an Access and Mobility Management Function (AMF) 503 provides a communication over an N12 interface 507 to an Authentication Server Function (AUSF) 508. The AUSF 508 provides access to a Unified Data Management (UDM) 509 that maintains the information required for the VPLMN 504 to authenticate the UE 302.

Billing information is communicated between the VPLMN 504 and the HPLMN 506 by communications established between a Visitor Policy Control Function (VPCF) 511 and a Home PCF (HPCF) 513 over an N24 interface 514.

User plane packets flow through User Plane Functions (UPFs) 515, 517 in each of the PLMNs 504, 506. The UPF 517 within the VPLMN 506 connects with various data networks (PDNs) 519 over an N6 interface 521.

FIG. 6 shows a 5G NR architecture for local breakout operation in the NR context. In this case, the local breakout is done that allows the UPF 515 in the VPLMN 504 to provide access directly to data networks 602. In addition, billing can be handled by the VPCF 511 in the VPLMN 506 and the HPCF 513 in the HPLMN 504, which communicate over the N24 interface 514.

In each of these cases, the VPLMN identifies the HPLMN based on the PLMN identifier (PLMN ID), which is unique and provided by the UE 302. However, in the case in which the UE 302 is attempting to access a PEN, the PEN is identified by a SHNI in which all of the enterprise deployments use the same PLMN. That is, enterprise networks are not uniquely identified. Additionally, the particular roaming agreement associated with a particular UE 302 may be with a specific enterprise deployment and not generic to all deployments made by a given enterprise deployment vendor (hereafter, referred to simply as a "vendor") supplying equipment to the different enterprise campuses.

An alternative approach that might be implemented is to have independent SIM credentials assigned. However, this does not scale very well. In such a scheme, roaming into MNOs would require independent credentials for each MNO. Roaming with the numerous enterprises would require independent credentials to be stored for individual enterprises.

For roaming to be possible with specific enterprise entities, it is necessary for appropriate routing from the VPLMN (MNO or another enterprise network) to the HPLMN (Home enterprise network) to allow the VPLMN core network to reach the appropriate HSS. Such routing from an MNO network or another enterprise deployment to reach the enterprise HSS is not currently possible.

Accordingly, it would be advantageous to provide a system that provides a mechanism by which a VPLMN (MNO or another enterprise network) to find the required HSS credentials for authentication of roaming UE. In addition, a communication interface and protocol is required that would allow billing information to managed during such roaming.

SUMMARY

The presently disclosed method and apparatus provides a means by which user equipment (UE) having an International Mobile Subscriber Identity (IMSI) that has a Shared Home Network Identity (SHNI) can gain access to a Home Subscriber Server (HSS) to access authentication information when the UE is not currently within its home network.

In some embodiments, a central server receives a request from a network core of a Visitor Public Land Mobile Network (VPLMN) to validate a UE. The network core then requests a route to be established to a Home Subscriber Server that contains authentication information for the UE. The network core makes this request to a central server that has a database of information through which the central server can cross reference the IMSI to a particular vendor (or router associated with the vendor) to which an International Block Number (IBN) within the IMSI has been assigned. The central server then forwards the request to a vendor level router associated with the vendor to which that IBN was assigned. The vendor level router maintains a database of enterprises to which it has assigned IMSIs and provides a means by which the particular enterprise to which the UE is a subscriber can be identified. Upon identifying the enterprise, the request is then sent from the vendor level router an enterprise level router. The enterprise level router then determines where the HSS that contains the requested information resides and sends the request to the HSS. The information is then retrieved from the HSS and sent back through the same path of enterprise level router, vendor level router and central server to provide the requested information to the core within the VPLMN.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
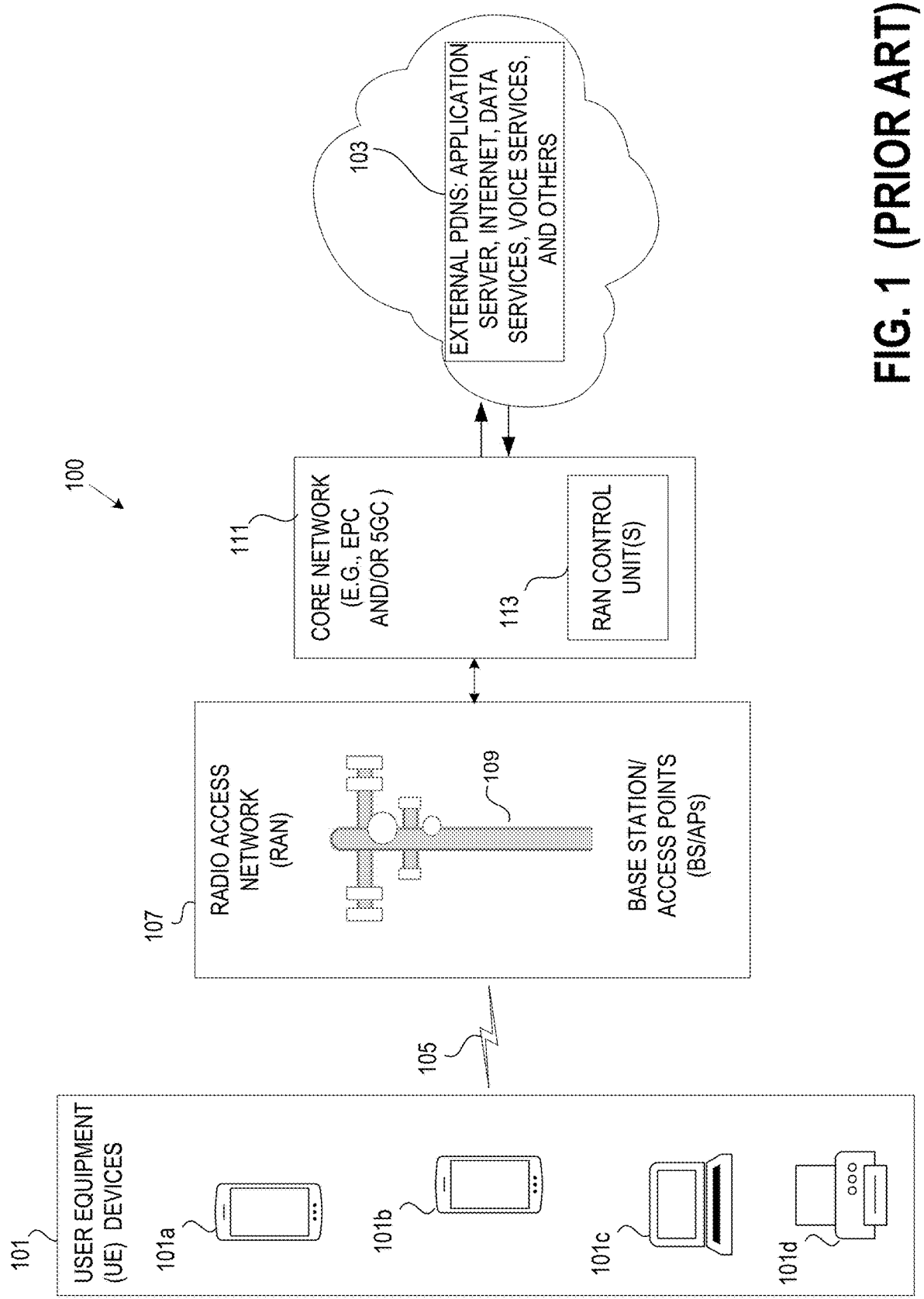
FIG. 1 is an illustration of a basic configuration for a communication network, such as a "4G LTE" (fourth generation Long-Term Evolution) or "5G NW" (fifth generation New Radio) network.
Figure 2:
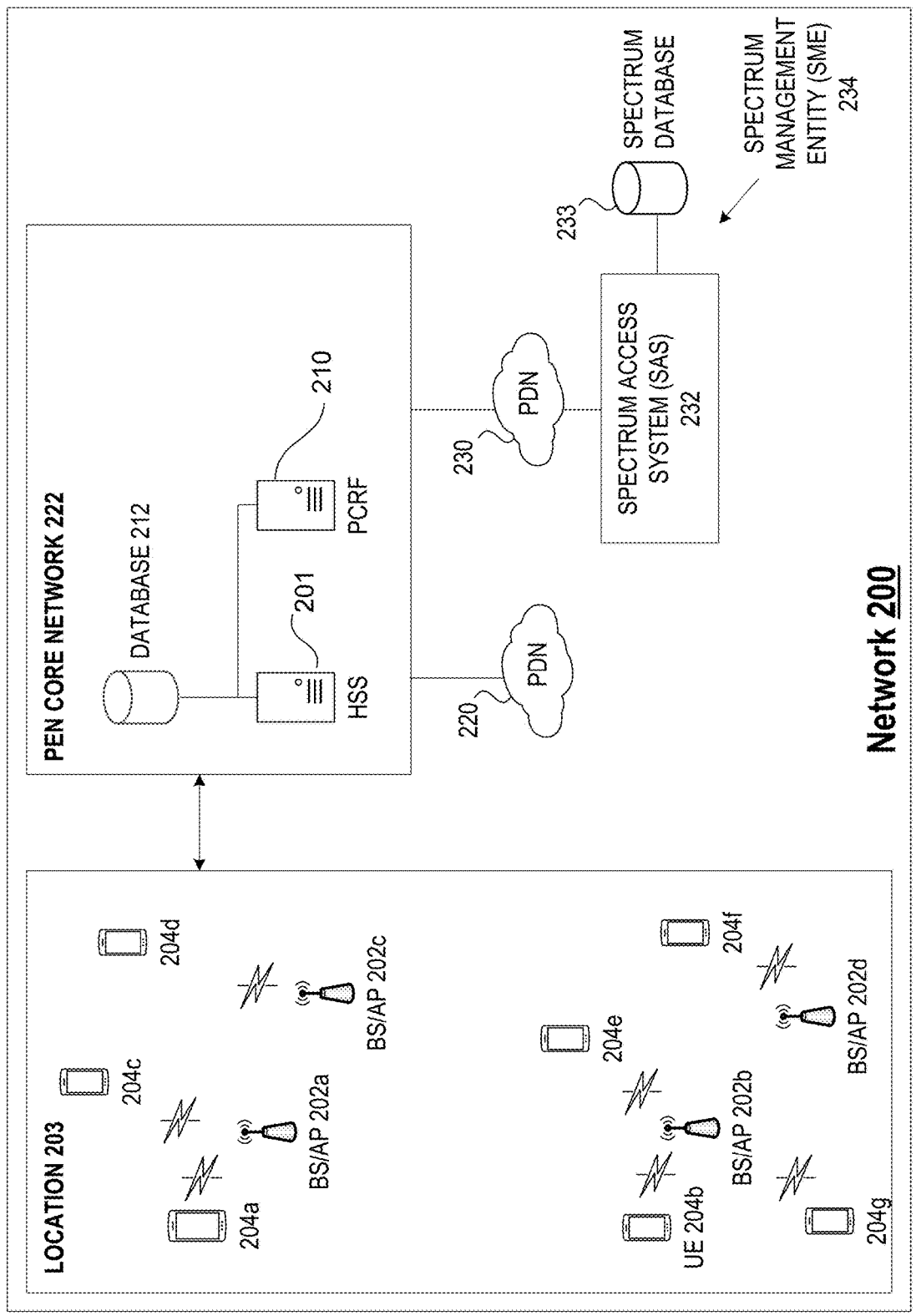
FIG. 2 is a simplified illustration of a private enterprise network (PEN).
Figure 3:
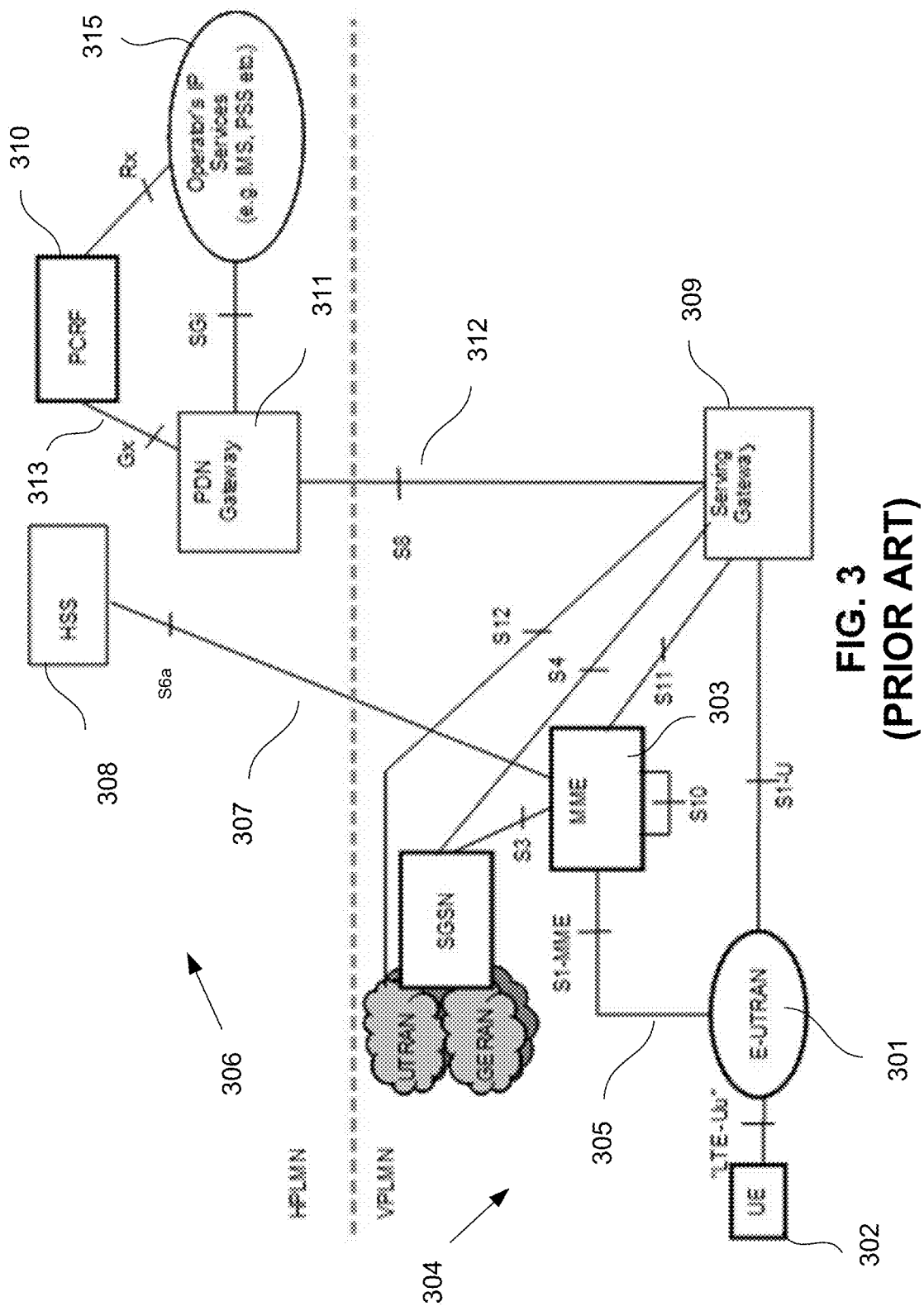
FIG. 3 illustrates the roaming architecture for home routed traffic based on 3GPP (Third Generation Partnership Project) specifications.
Figure 4:
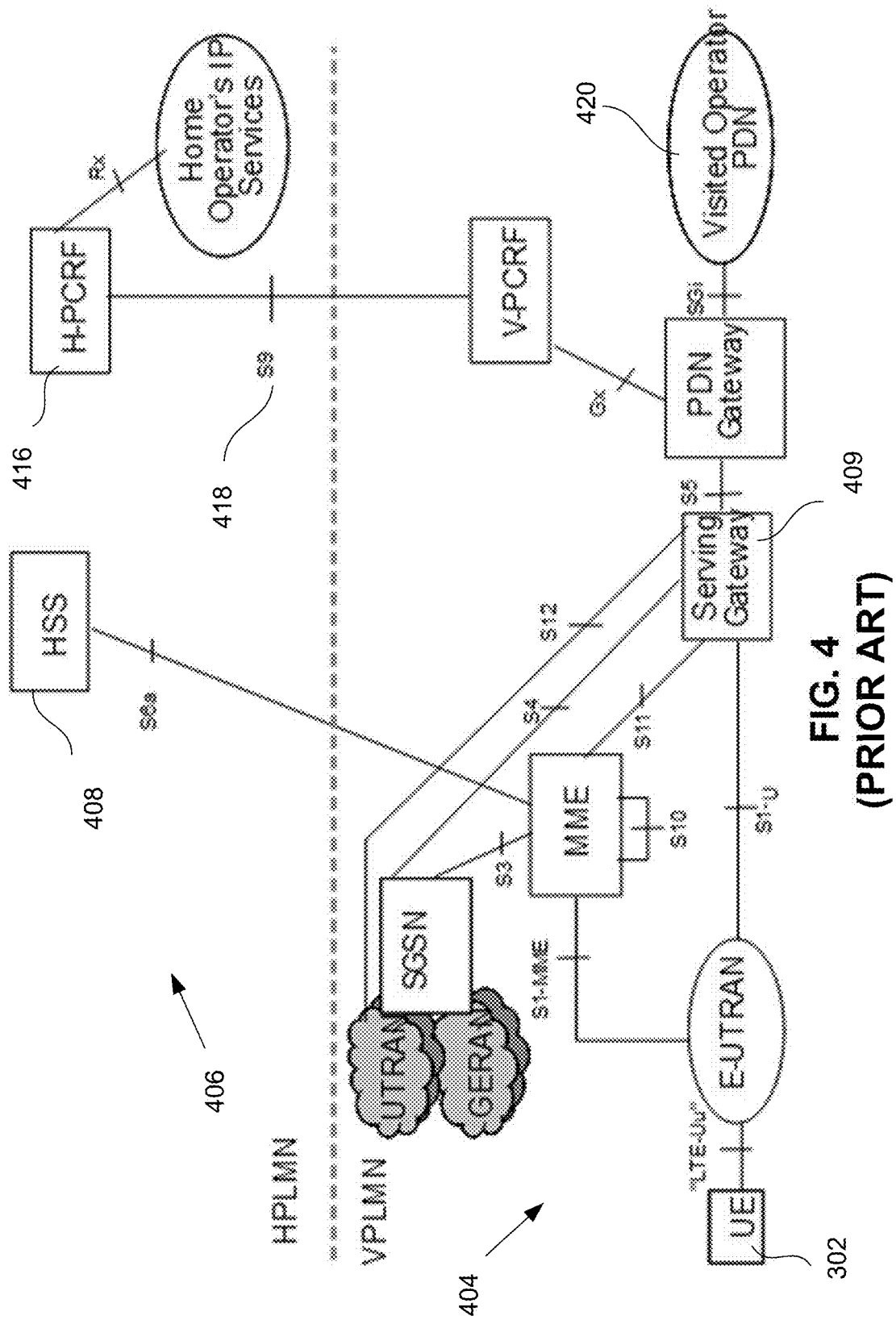
FIG. 4 shows a 4G LTE architecture for a VPLMN connecting to the HPLMN using what is referred to as a "local breakout" (LBO).
Figure 5:
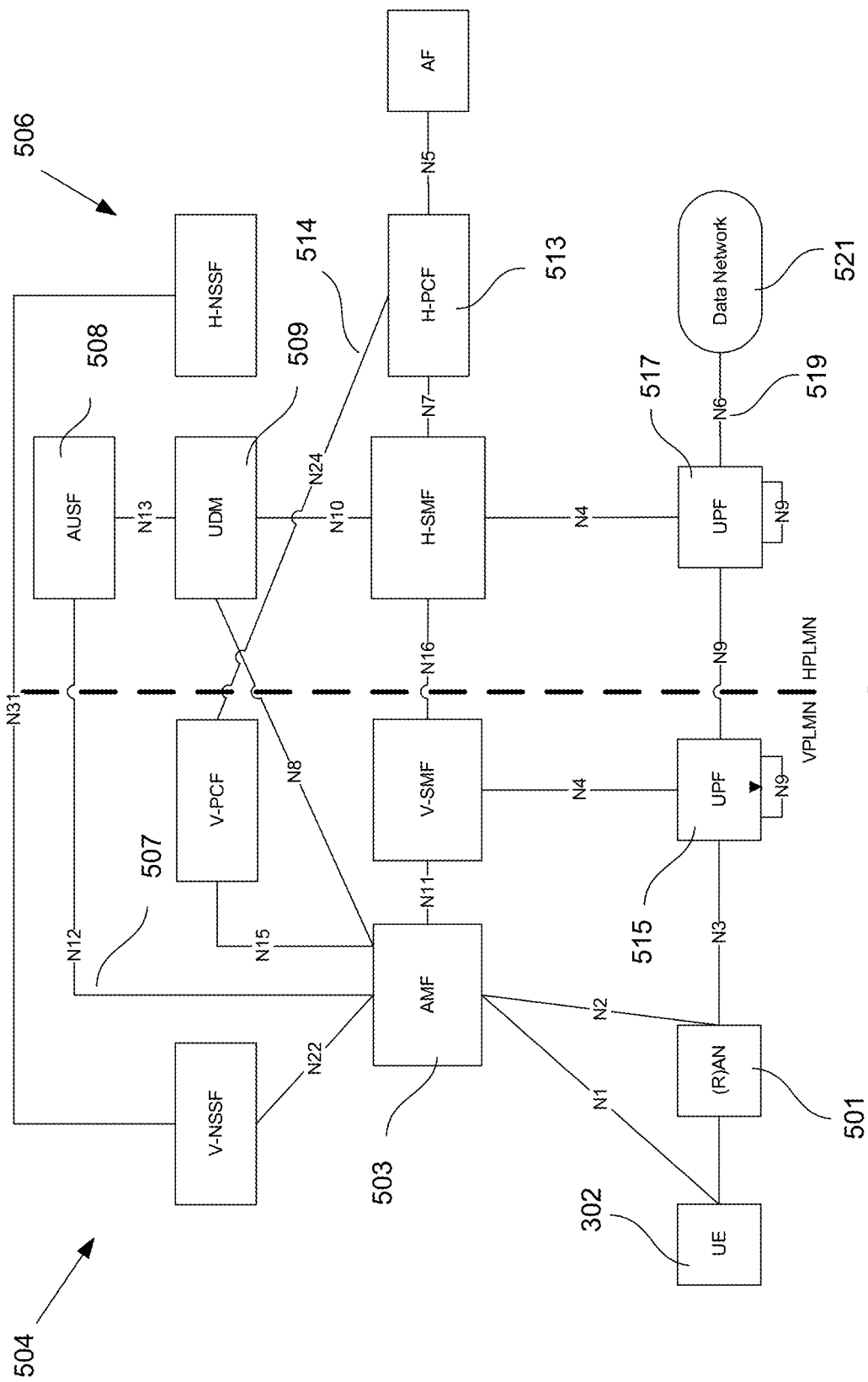
FIG. 5 shows a 5G NR roaming architecture in which traffic is routed through the HPLMN to the UE being serviced through the VPLMN RAN.
Figure 6:
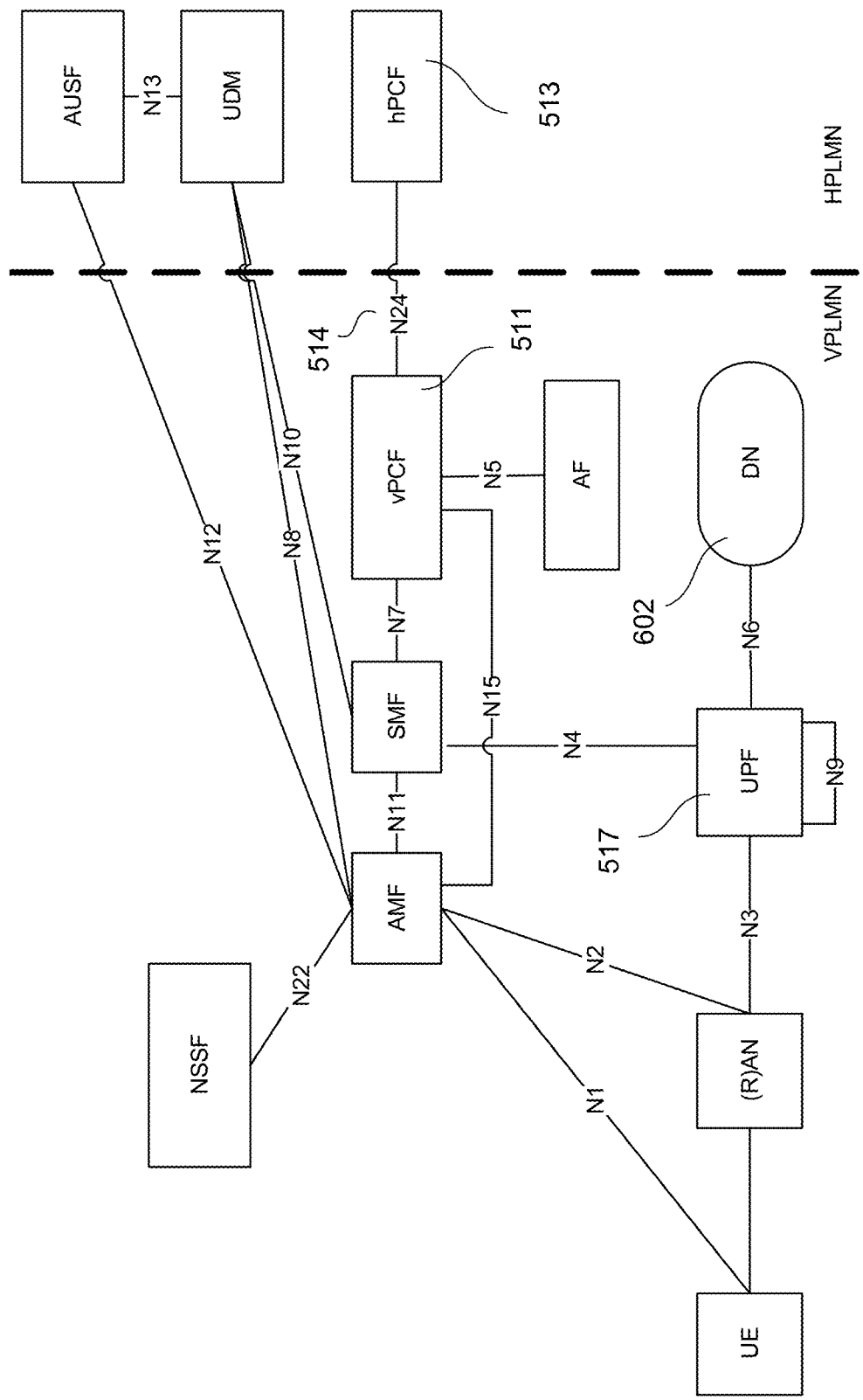
FIG. 6 shows a 5G NR architecture for local breakout operation in the NR context.
Figure 7:
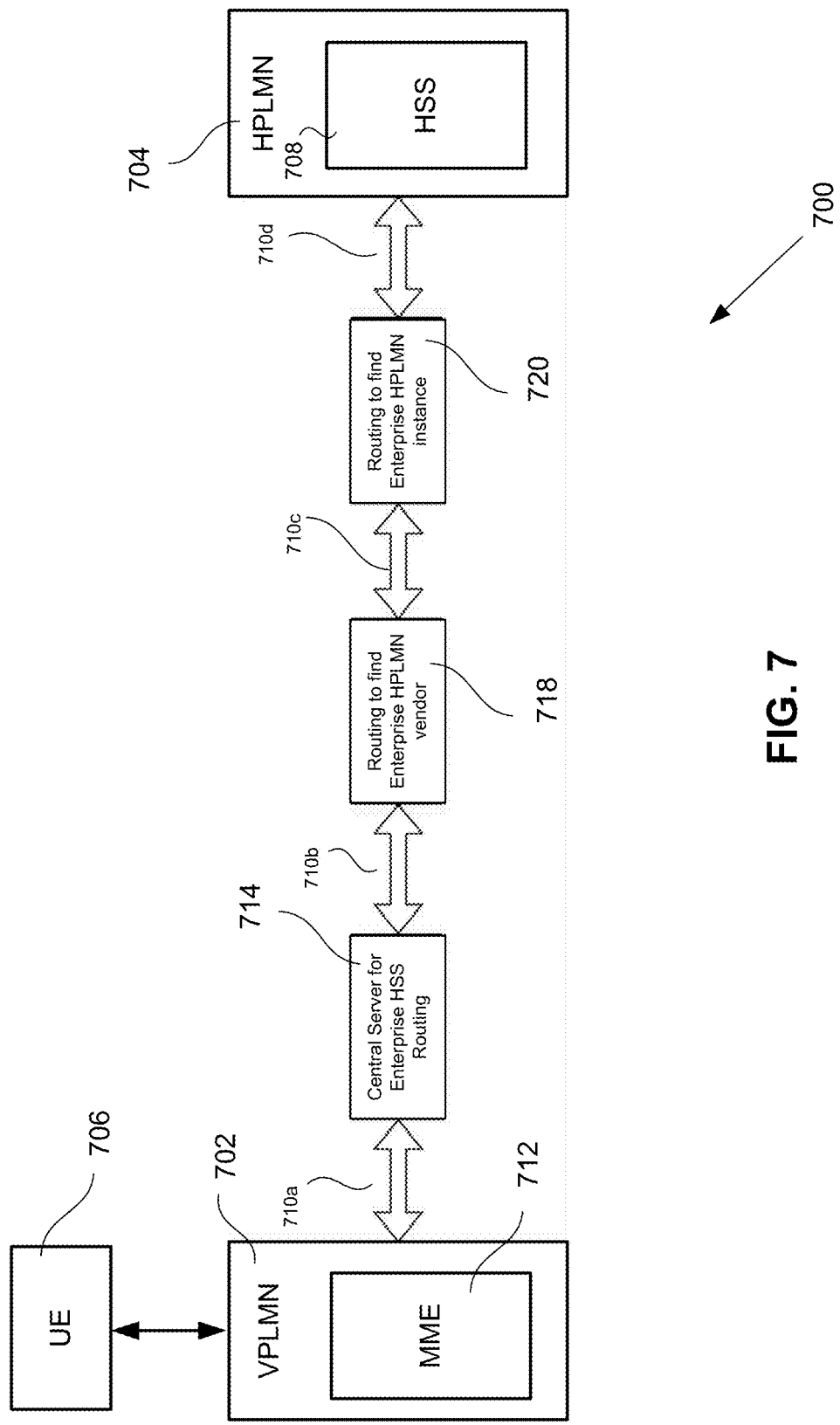
FIG. 7 is an illustration of a system in which a Visitor Public Land Mobile Network (VPLMN) operating as a 4G network can identify a communication path to a Home Private Enterprise Network (HPEN) or Home PLMN to which a User Equipment (UE) is a subscriber.

FIG. 7 is an illustration of a system 700 in which a Visitor Public Land Mobile Network (VPLMN) 702 operating as a 4G network can identify a communication path to a Home Private Enterprise Network (HPEN) or Home Public Land Mobile Network (HPLMN) 704 to which a User Equipment (UE) 706 is a subscriber (or otherwise has access credentials stored in an HSS 708 to allow the allow the VPLMN to authenticate the UE 706).

In some embodiments, the VPLMN 702 reaches a central server 714 to find the HPLMN 704 (which in some embodiments is an enterprise network) to authenticate the UE 706 with credentials associated with a Shared Home Network Identity (SHNI). Normally a Home Network Identifier (HNI) is assigned to a single operator. In such cases, the operator is responsible for managing the uniqueness of International Mobile Subscription Identify (IMSI) codes and other identifiers constructed using the HNI. However, the Alliance for Telecommunications Industry Solutions (ATIS) IMSI Oversight Committee (IOC) has made it possible for a SHNI to be used simultaneously by a large number of operators in a Citizens Broadband Radio System (CBRS) ecosystem.

Figure 8:
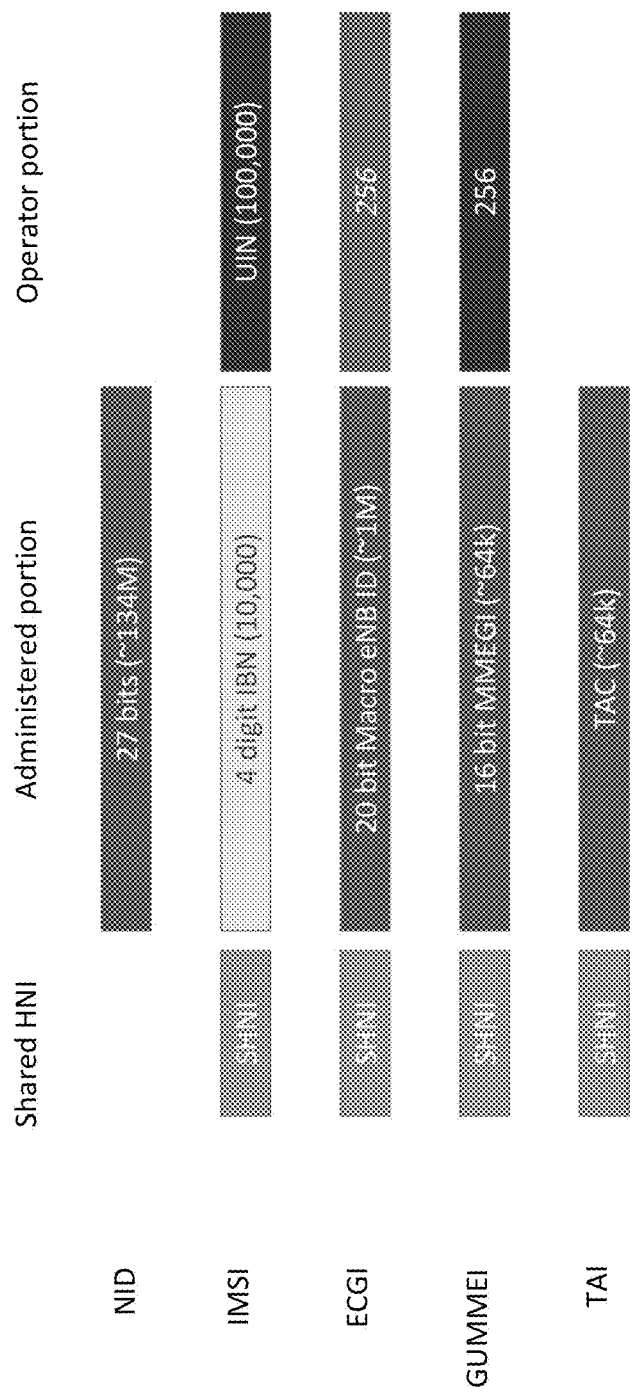
FIG. 8 illustrates the relationship between the SHNI, the administered portions of each identifier and an operator portion of an identifier with respect to a Network Identifier (NID), IMSI, E-UTRAN Cell Global Identity (ECGI), Global Unique Mobile Management Entity Identity (GUMMEI), and Tracking Area Identity (TAI).

FIG. 8 illustrates the relationship between the SHNI, the administered portions of each identifier and an operator portion of an identifier with respect to a Network Identifier (NID), IMSI, E-UTRAN Cell Global Identity (ECGI), Global Unique Mobile Management Entity Identity (GUM-MEI), and Tracking Area Identity (TAI).

An IMSI is a number that uniquely identifies every UE that has access to a PLMN (whether MNO, Private Enterprise Network (PEN) or other network operating in accordance with 3GPP standards). It is stored as a 64-bit field and is sent by the UE 706 to the PLMN (such as an HPLMN or when the UE 706 is outside the HPLMN coverage area, a VPLMN 702). It is also used for authenticating and acquiring other details of the UE 706 in the HPLMN or VPLMN. To prevent eavesdroppers from identifying and tracking the subscriber on the radio interface, the IMSI is sent as rarely as is possible and a randomly-generated Temporary Mobile Subscriber Identity (TMSI) is sent instead.

In some embodiments one or more central servers 714 may exist. In some embodiments, this is based on the relationships between interacting entities (e.g., MNOs and operators of PENs that have established agreements with the MNOs). In some embodiments, the central server 714 has the required association information to reach and attain desired authentication information from the HSS 708, Authentication Server Function (AUSF) 908 (see FIG. 9), or other authentication apparatus within a PEN or other network operating in accordance with 3GPP standards.

When the UE 706 attempts to connect to the VPLMN 702, the VPLMN communicates with the central server 714 to authenticate the UE 706. In some embodiments, routing from the central server 714 is done based on the PLMN. In other embodiments, it is possible to use the NID to determine the route through the central server to the establish a connection to an HSS during authentication or for other purpose in which information from the home network is desired. In some cases, the PLMN ID is an SHNI. The PLMN ID is part of the IMSI provided by the UE 706 during an attach procedure performed by the UE 706 and the VPLMN 702. There is only one value currently assigned as an SHNI. Accordingly, in some embodiments, when the UE 706 attempts to access a 4G network, the MME 712 recognizes the SHNI within the IMSI of the UE 706 and so routes a request for information that is stored in the HSS 708 through an associated central server 714. As noted above, in other embodiments, the central server uses the NID to determine the route to the source of information within the UE's home network. Accordingly, the central server uses either a network ID or UE associated identifier (such as the IMSI) to route requests for information toward a source of such information (such as an HSS within the UE's home network).

Given that the size of a typical PEN and the fact that the size and number of such PENs that might be associated with the same SHNI may vary significantly, directly identifying PENs from a central server 714 that maintains information for all of the possible IMSIs for all of the possible networks that exist, may not be possible. Therefore, in accordance with some embodiments of the disclosed method and apparatus, a request received by the central server 714 for authentication information is routed to a device that has information regarding the vendor that is responsible for having supplied the credentials to the specific UE 706 and the network to which the UE 706 subscribes.

The central server 714 maintains a mapping of IMSI ranges and associates each IMSI with the specific vendor. The number of vendors will be much smaller than the number of enterprises where PENs are deployed, since each such vendor typically will be responsible for having deployed a significant number of PENs.

The vendor retains a central repository of the credentials supplied to the different enterprises. A router 718 with which the central server 714 communicates maintains information that allows that router 718 to route the request to yet another router 720. That router 720 maintains information regarding the specific enterprise deployment, including information allowing information to be retrieved from an HSS supported by the specific enterprise. In addition, the HSS may have particular information regarding the UE having an IMSI that is the subject of the query being serviced.

In some embodiments, the PEN supports the HSS in a central cloud across different sites for that enterprise. Alternatively, an HSS retains the credential in the individual site that is the home for the UE 706 within the PEN. Accordingly, the routing to the appropriate HSS entity is performed.

It can be seen that there is a hierarchy of user credential storage. That is a first server (e.g., the central server 714) stores a list of vendors associated with the SHNI. A second server (e.g., the router 718) identifies a PEN central entity that might be responsible for several sites within the PEN. A third router (e.g., the router 720) identifies the particular enterprise site at which the HSS information can be found.

That is, the server 714 is essentially a router that has the ability to associate the IMSI with a particular vendor and route the communications originating from the UE 706 with that IMSI to a second component 718 that handles only IMSIs associated with that particular vendor. The second component 718 is essentially another router that routes IMSIs associated with that particular vendor to a particular PEN. That is, as noted above, there are typically several PENs for which a particular vendor has assigned one or more groups of IMSIs. Each PEN is assigned a unique subset of the vendors from the total allotment of IMSIs. The second router 718 maintains a database of information that allows it to route the communications originating from UE 706 associated with the IMSI to a third router (e.g., router 720). The router 720 has information regarding the logical location of an HSS 708 (or other such repository of information required for authentication), within a particular physical location (campus) in the PEN. It should be noted that in addition to information required for authentication, other information regarding limitations or minimum performance parameters may be attained from an information repository (such as the HSS) that indicate capabilities and limitations of the UE, as imposed by the UE's subscription to the enterprise and agreements between the enterprise and other networks.

In some embodiments, the ultimate location at which the information resides is where the IMSI (and others in the same subset of IMSIs) were assigned. The router 720 can then access the HSS 708 (or other such repository of performance and HSS type information) within the HPLMN 704 (or home PEN).

The intermediate communications links 710 between components 714, 718, 720 are protected by using Internet Protocol Secure (IPsec) tunneling. Security certificates are mutually managed between the participating components 714, 718, 720 and the associated communication links 710.

This established route through the components 714, 718, 720 is used for both home routing of the packet connectivity and to support billing.

Figure 9:
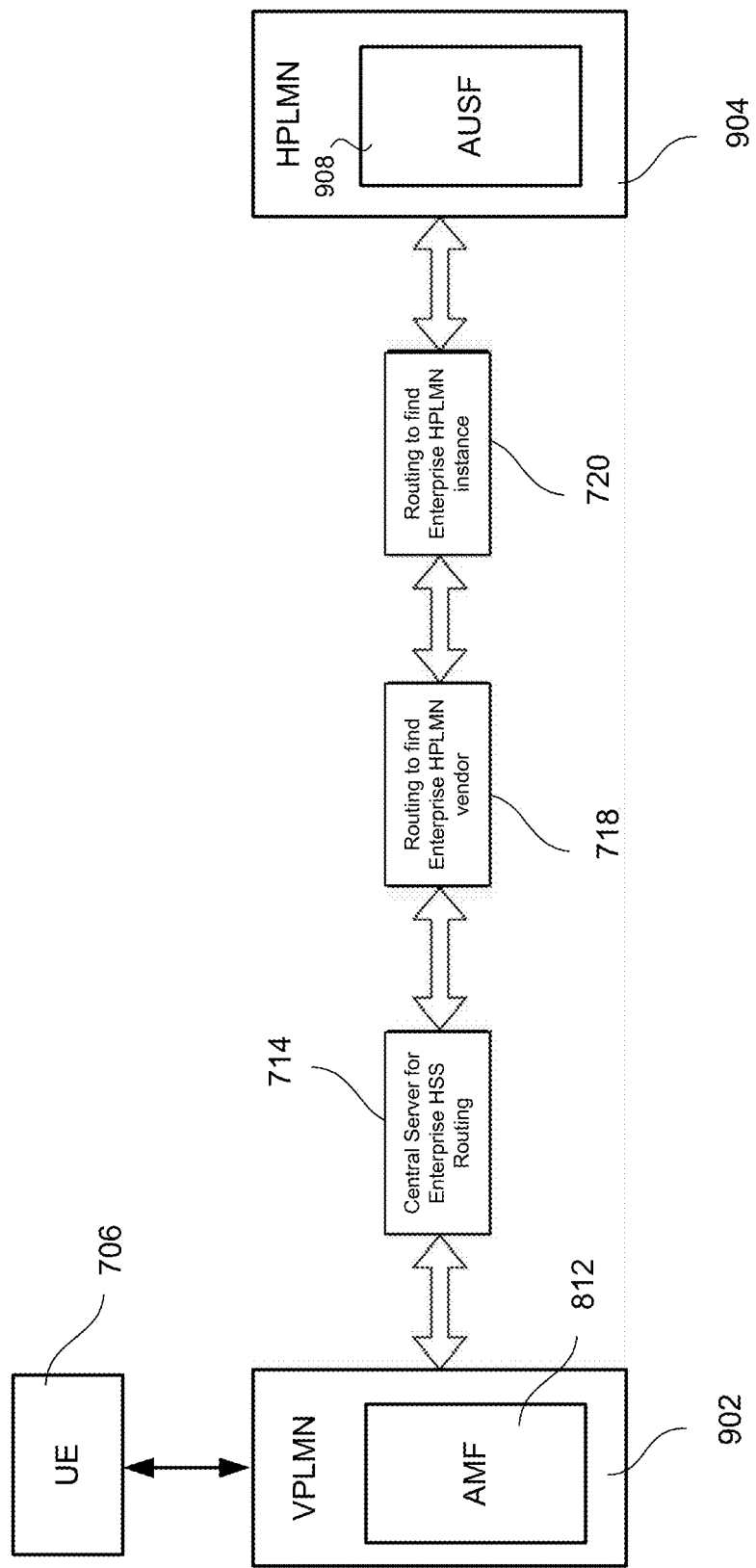
FIG. 9 reflects the fact that the VPLMN and HPLMN may be a 5G NR networks.

FIG. 9 is similar to FIG. 7 but reflects the fact that the VPLMN may be a 5G NR network 902 with an AMF 812 and the HPLMN 904 is a 5G NR network with an AUS 908. However, in this case, the central server 714 operates essentially the same.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising: a central server for routing communications originating at a user equipment (UE) that is associated with a identifier; a second routing component coupled to the central server, for receiving communications routed from the central server to the second routing component based on the enterprise deployment vendor to which the identifier was assigned; a third routing component coupled to the second routing component, the third routing component receiving communications from the second routing component based on the particular network to which the identifier was assigned by the vendor, the third routing component routing the communications to a particular site in the network at which a repository of information resides that can be used to assist in authenticating the UE, wherein the identifier is a UE identifier; wherein the identifier is an International Mobile Subscriber Identifier (IMSI) assigned to the UE; and a plurality of second routing components, wherein the central server comprises a database containing information to cross reference IMSIs provided by user equipment to a particular one of a plurality of second routing components, the central server being configured to determine, from the information contained within database, to which of the plurality of second routing components to send the communication.

2. The system of claim 1, further comprising a plurality of third routers, wherein the second router comprises a second database containing information to cross reference IMSIs received from the particular one of the second routing components to a particular one of the plurality of third routers, the particular one of the second routing components configured to determine, from the information contained within the second database, to which of the plurality of third routing components to send the communication.

3. The system of claim 2, wherein the third routing component is configured to:
   a) request information from the repository of information that resides at the particular site in the network;
   b) receive the requested information; and
   c) send the received requested information to the particular second routing component.

4. The system of claim 3, wherein the requested information includes authentication information.

5. The system of claim 3, wherein the requested information includes performance parameters.

6. The system of claim 5, wherein the performance parameters include limitations placed on the operation of the UE.

* * * * *